United States Patent [19]

Kanagawa et al.

[11] Patent Number: 5,300,592
[45] Date of Patent: Apr. 5, 1994

[54] THERMOSETTING RESIN COMPOSITION AND A COMPOSITE MATERIAL COMPRISING CURED PRODUCT AND SAID RESIN COMPOSITION AND ITS MATRIX

[75] Inventors: Shuichi Kanagawa, Osaka; Kunimasa Kamio, Suita; Shigeo Hozumi, Minoo; Hiroshi Nakamura; Masao Yamagiwa, both of Ibaraki, all of Japan

[73] Assignee: Sumitomo Chemical Company, Limited, Osaka, Japan

[21] Appl. No.: 971,263

[22] Filed: Nov. 4, 1992

Related U.S. Application Data

[60] Continuation of Ser. No. 711,016, Jun. 6, 1991, abandoned, which is a division of Ser. No. 360,589, Jun. 2, 1989, Pat. No. 5,041,507, which is a continuation of Ser. No. 933,893, Nov. 24, 1986, abandoned.

[30] Foreign Application Priority Data

Nov. 26, 1985 [JP] Japan .................. 60-265613
May 29, 1986 [JP] Japan .................. 61-125382
Jun. 20, 1986 [JP] Japan .................. 61-145565
Jun. 27, 1986 [JP] Japan .................. 61-152579

[51] Int. Cl.$^5$ .................. C08L 63/04; C08L 79/08; C08G 59/40
[52] U.S. Cl. .................. 525/488; 525/502; 525/504; 528/98; 528/101; 528/117; 528/170; 528/322
[58] Field of Search .................. 525/502, 504, 488; 528/98, 101, 117, 170, 322

[56] References Cited

U.S. PATENT DOCUMENTS

| | | | |
|---|---|---|---|
| 3,329,737 | 7/1967 | Smith | 525/490 |
| 4,127,615 | 11/1978 | Zahir et al. | 525/502 |
| 4,130,600 | 12/1978 | Zahir et al. | 525/530 |
| 4,173,592 | 11/1979 | Suzuki et al. | 525/134 |
| 4,510,272 | 4/1985 | Loszewski | 528/117 |
| 4,552,935 | 11/1985 | Haug et al. | 525/488 |
| 4,755,569 | 7/1988 | Kanagawa et al. | 525/504 |
| 4,816,531 | 3/1989 | Young | 528/117 |
| 4,868,059 | 9/1989 | Walker et al. | 525/482 |

FOREIGN PATENT DOCUMENTS

| | | |
|---|---|---|
| 0178546 | 4/1986 | European Pat. Off. . |
| 0225174 | 6/1987 | European Pat. Off. . |
| 2818091 | 11/1978 | Fed. Rep. of Germany . |
| 134099 | 11/1978 | Japan . |
| 53-134099 | 11/1978 | Japan . |
| 36121 | 2/1984 | Japan . |
| 53526 | 3/1985 | Japan . |
| 60-60123 | 4/1985 | Japan . |
| 60-106824 | 6/1985 | Japan . |
| 219756 | 11/1985 | Japan . |

OTHER PUBLICATIONS

"Epoxy Resins-Their Applications and Technology", Lee, H., 1957, TP 986.E6 L4 C.9, pp. 154–157.
Modern Plastics Encyclopedia 1981–1982, p. 18.
Chambers Dictionary Of Science And Technology, p. 417.
World Patents Index Latest, Derwent Publications Ltd., London, GB; An 84-130908 & JP-A-59-066414 (Daicel Chem Ind KK), 14 Apr. 1984.

Primary Examiner—Frederick Krass
Attorney, Agent, or Firm—Stevens, Davis, Miller & Mosher

[57] ABSTRACT

A resin composition comprising a polymeleimide compound having two or more maleimide groups in one molecule, a phenol novolac resin of which phenolic hydroxyl groups are epoxidized and allyl-etherified and, as an optional ingredient, a curing agent, or a resin composition comprising a polymaleimide compound having two or more maleimide groups in one molecule, a phenol novolac resin of which phenolic hydroxyl groups are allyl-etherified and an epoxy resin; and a heat resistant composite material comprising cured product of said resin composition as its matrix phase and containing a fiber as its reinforcing material.

14 Claims, No Drawings

THERMOSETTING RESIN COMPOSITION AND A COMPOSITE MATERIAL COMPRISING CURED PRODUCT AND SAID RESIN COMPOSITION AND ITS MATRIX

This application is a continuation of application Ser. No. 07/711,016, filed Jun. 6, 1991, now abandoned which in turn is a Divisional application of Ser. No. 07/360,589, filed Jun. 2, 1989, now U.S. Pat. No. 5,041,507 which in turn is a continuation of application Ser. No. 06/933,893, filed Nov. 24, 1986 now abandoned.

BACKGROUND OF THE INVENTION

1. Field of the Invention

The present invention relates to a thermosetting resin composition, and more particularly to a thermosetting resin composition excellent in processability, heat resistance and adhesive property.

Further, the present invention relates also to a composite material excellent in mechanical strength at high temperature and in hot water resistance which comprises cured product of said thermosetting resin composition as its matrix.

2. Description of the Prior Art

Thermosetting resins are used as materials for castings impregnation, lamination and molding in the fields of electrical insulation, construction, etc. In these fields, there is a current tendency that the conditions under which these materials are used become more and more severe. Particularly? an increasing importance is being attached to heat resistance of material.

Hitherto, thermosetting polyimide resin and heat resistant epoxy resin have been used for such purposes.

However, polyimide resin is disadvantageous in that its processing requires a longterm heating at a high temperature. Although epoxy resin having an improved heat resistance is excellent in processability, it is also disadvantageous in that it is insufficient in the high-class heat resistances, i.e. mechanical and electrical properties at high temperatures.

As a material capable of replacing them, there was proposed in Japanese Patent Kokai (Laid-open) No. 154,897/77 a thermosetting mixture comprising a polyimide, an allyl group-containing epoxy compound having a special structure and a curing agent. However, the allyl group-containing epoxy compound used therein was a compound prepared by subjecting an allyl ether compound to Claisen rearrangement and then epoxidizing the rearranged product, from which a uniform cured product is difficult to prepare probably because the nucleus-substituting allyl group and epoxy group are located on the ortho positions of one aromatic ring. Particularly in the case of novolac type, this type of compositions were inferior in physical properties and heat resistance of cured product probably because some of these groups are apt to remain unreacted.

Further, in Japanese Patent Kokai (Laid-Open) No. 134,099/78, there was proposed a heat resistant resin composition comprising a specified maleimide compound, a polyallyl phenolic compound, an epoxy resin and a curing agent, However, this composition was inferior in electrical properties at high temperatures and resistance to thermal deterioration because the polyallyl phenolic compound used therein had a phenolic hydroxyl group or had a structure capable of forming a phenolic hydroxyl group by Claisen rearrangement when the composition was heated and cured. Thus, in order to overcome such a fault, the composition had to contain an epoxy resin and a curing agent capable of reacting with phenolic hydroxyl group, due to which the composition decreased its heat resistance.

On the other hand, composite materials containing a fiber as a reinforcing material have a high tensile strength and a high elastic modulus, owing to which its use is expanding in various fields such as structural materials of aircrafts and automobiles, constituent parts of engines, etc.

As the matrix phase material of these composite materials, thermosetting resins, particularly epoxy resins, have been used mainly for the reason of their good moldability and physical properties.

However, since composite materials have become applicable to more and more extensive fields in the recent time, it is desired today to develop a new material capable of retaining the high chemical stability and the good mechanical properties even at a temperature exceeding the temperature range in which the conventional composite materials containing an epoxy resin as their matrix are put to use. Thus, the use of various resins including polyimide resin as the matrix has been studied. However, all the resins hitherto studied are disadvantageous in that they are difficult to mold, and molded products prepared therefrom tend to contain vacancies and some of them are inferior in adhesive strength between matrix and reinforcing material and therefore cannot give a product of high strength.

Considering the above-mentioned background, the present inventors conducted earnest studies to find that a resin composition comprising a specified resin and a polymaleimide compound having two or more maleimide groups in one molecule is excellent in heat resistance and processability and can satisfy the above-mentioned requirements.

Further, the present inventors also found a fiber reinforced composite material excellent in moldability and strength, capable of retaining its high strength even at high temperatures and having an excellent hot water resistance can be obtained by using, as the matrix phase, cured product of a resin composition comprising a polymaleimide compound having two or more maleimide groups in one molecule and a phenol novolac resin of which phenolic hydroxyl groups are epoxidized and allyl-etherified (optionally containing a curing agent, too) or cured product of a resin composition comprising a polymaleimide compound having two or more maleimide groups in one molecule, a phenol novolac resin of which phenolic hydroxyl groups are allyl-etherified and an epoxy resin and using a fiber as a reinforcing material.

Based on the above-mentioned findings, the present invention was accomplished.

According to the present invention, there is provided a thermosetting resin composition comprising a polymaleimide compound having two or more maleimide groups in one molecule and a phenol novolac resin of which phenolic hydroxyl groups are epoxidized and allyl-etherified, and optionally a curing agent.

Further, according to the present invention, there is also provided a thermosetting resin composition comprising a polymaleimide compound having two or more maleimide groups in one molecule, a phenol novolac resin of which phenolic hydroxyl groups are allyl-etherified and an epoxy resin.

Further, according to the invention, there is also provided a heat resistant composite material containing, as its matrix, cured product of a resin composition comprising a polymaleimide compound having two or more maleimide groups in one molecule and a phenol novolac resin of which phenolic hydroxyl groups are epoxidized and allyl-etherified and optionally a curing agent, and containing a fiber as the reinforcing material.

Further, according to the present invention, there is also provided a heat resistant composite material containing, as its matrix, cured product of a resin composition comprising a polymaleimide compound having two or more maleimide groups in one molecule, a phenol novolac resin of which phenolic hydroxyl groups are allyl-etherified and an epoxy resin and containing a fiber as its reinforcing material.

DETAILED DESCRIPTION OF THE INVENTION

The substituted phenol novolac resins of which phenolic hydroxyl groups are allyl-etherified, used in the invention, can be produced; for example, according to the process mentioned in Japanese Patent Kokai (Laid-open) No. 36,121/84. Thus, they can be produced by condensing at least one substituted phenol having alkyl group, alkenyl group, aryl group, aralkyl group or halogen atom as a substituent (concrete examples of said substituted phenol include cresol, ethylphenol, isopropylphenol, butylphenol, octylphenol, nonylphenol, vinylphenol, isopropenylphenol, phenylphenol, benzylphenol, chlorophenol, bromophenol, xylenol methylbutylphenol and their isomers) with an aldehyde compound such as formaldehyde, furfural, acrolein, glyoxal and the like to form a novolac resin usually having a mean nuclei number of 2 to 15, followed by reacting the latter with an allyl halide such as allyl chloride, allyl bromidel allyl iodide and the like in the presence of an alkali. In the substituted phenol novolac resin thus obtained, 50% or more, particularly 90% or more, of the phenolic hydroxyl groups are preferably converted to allyl ether. Allyl-etherified cresol novolac resin is particularly desirable in the invention.

The phenol novolac resin of which phenolic hydroxyl groups are epoxidized; used in the invention, can be produced by partially epoxidizing the allyl-etherified phenol novolac resin which has been produced in the above-mentioned manner.

As the method of the partial epoxidation, a method which comprises partially allyl-etherifying a phenol novolac resin so that it reaches the intended degree of allyl-etherification, followed by reacting the residual hydroxyl groups with an epihalohydrin such as epichlorohydrin, epibromohydrin, methylepichlorohydrin and the like in the presence of an alkali, and a method which comprises nearly completely allyl-etherifying a phenol novolac resin, followed by partially epoxidizing the allyl-etherified product with a peroxide such as hydrogen peroxide, peracid or the like so as to reach the intended degree of epoxation can be referred to.

The ratio of the allyl-etherified hydroxyl groups to the epoxidized hydroxyl groups should be preferably 0.5 to 9.0, and more preferably 0.7 to 4.0.

If the proportion of the allyl-etherified hydroxyl groups is higher than above, adhesive property is deteriorated. If it is smaller than above, heat resistance is deteriorated.

The polymaleimide compound having two or more maleimide groups in one molecule, used in the invention, has two or more maleimide groups represented by general formula (I) in one molecule:

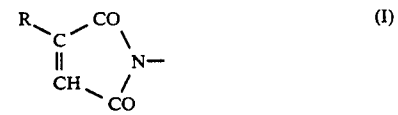

wherein R represents hydrogen atom or lower alkyl group having 1 to 5 carbon atoms.

Its concrete examples include N,N'-bismaleimide compounds such as N,N'-diphenylmethane-bismaleimide, N,N'-phenylenebismaleimide, N,N'-diphenyl ether bismaleimide, N,N'-diphenyl sulfone bismaleimider N,N'-dicyclohexylmethane-bismaleimide, N,N'-xylene-bismaleimide, N,N'-tolylene-bismaleimide, N,N'-xylylene-bismaleimide, N,N'-diphenylcyclohexane-bismaleimide, N,N'-dichlorodiphenylmethane-bismaleimide, N,N'-diphenylmethanebismethylmaleimide, N,N'-diphenyl ether bismethyl-maleimide N,N'-diphenyl sulfone bismethylmaleimide (including isomers)p N,N'-ethylenebismaleimide, N,N'-hexamethylenebismaleimide and N,N'-hexamethylenebismethylmaleimide; prepolymers having N,N'-bismaleimide skeletons on their molecular ends which can be obtained by adding a diamine compound to the above-mentioned N,N'-bismaleimide compounds; and maleimide and methyl maleimide derivatives of anilin-formaldehyde polycondensate. Among them, N,N'-diphenylmethane-bismaleimide and N,N'-diphenyl ether bismaleimide are particularly preferable.

Examples of the curing agent, optionally used in the invention, include active hydrogen-containing compounds reactive with epoxy group. That is to say, its examples include polyphenol compounds such as Bisphenol A, tetrabromo-Bisphenol A, Bisphenol F, Bisphenol S, bis(4-hydroxyphenyl)-cyclohexane, bis(4-hydroxyphenyl)-ethane, 1,3,3-trimethyl-1-m-hydroxyphenylindan-5-ol (or -7-ol), 1,3,3-trimethyl-1-p-hydroxyphenylindan-6-ol, resorcin, hydroquinone, catechol, and the above-mentioned phenol novolac resins, and the like; polycarboxylic acids such as maleic acid; phthalic acid, Nadic acid, methyl-tetrahydrophthalic acid, methyl-Nadic acid and the like and their anhydrides; polyamine compounds such as diaminodiphenylmethane, diaminodiphenyl sulfone, diaminodiphenyl ether, phenylenediamine, diaminodicyclohexylmethane, xylylenediamine, toluenediamine, xylenediamine, diaminodiphenyl-cyclohexane, dichloro-diaminodiphenylmethane (including isomers), ethylene diamine, hexamethylenediamine and the like; boron trifluoride amine complexes such as boron trifluoride ethylamine complex, boron trifluoride piperidine complex and the like; imidazole derivatives; tertialy amines; quaternary ammonium salts; dicyandiamide; tetramethylguanidine; and the like.

The epoxy resin used in the invention is not critical, so far as it has two or more epoxy groups in one molecule. Various epoxy resins ranging from those having a low molecular weight to those having a high molecular weight can be used in the invention.

Non-limitative examples of the epoxy resin usable in the invention include the epoxy resins which can be produced from epichlorohydrin and phenolic hydroxyl compounds (e.g. bisphenol A, tetrabromo-Bisphenol A, Bisphenol F, Bisphenol S, phenol novolac, cresol novolac, resorcin, hydroquinone and the like), amine compounds (e.g. 4,4'-diaminodiphenylmethane, aminophenol, aminocresol and the like), alcohols (e.g. polypropylene glycol, pentaerythritol and the like) and carboxylic acids (e.g. linoleic acid dimer, phthalic acid and the like).

In the resin composition used in the invention, the quantitative ratios between the ingredients may be appropriately decided in accordance with the use of composition and the intended heat resistance of the comidosition. Generally speaking, the ratio of the double bond of the polymaleimide compound to the double bond of the phenol novolac resin of which phenolic hydroxyl groups are epoxidized and allyl-etherified is 0.5 to 3 and preferably 0.6 to 2.5. When a curing agent is used, the ratio of the active hydrogen of the curing agent to the epoxy group of the phenol novolac resin is preferably 3 or below.

In the invention, the ingredients may be previously reacted to such as extent as to cause no gelation. When the three ingredients are used, it is preferable from the viewpoint of physical properties of cured product to react the phenol novolac resin and the polymaleimide compound in the first step and then react the curing agent therewith in the second step.

In the resin composition of the invention, the quantitative ratio between the allyl-etherified phenol novolac resin and the polymaleimide compound is preferably so controlled that the ratio of the double bond of the former to double bond of the latter comes to 0.3 to 3.0, preferably 0.5 to 2.0. In the resin composition of the invention, the proportion of epoxy resin may vary depending on the use and object. Usually, however, epoxy resin is used in an amount of 5 to 200 parts by weight, preferably 20 to 150 parts, per 100 parts by weight of allyl-etherified phenol novolac resin. Although adhesive property, insulating property and water resistance are improved by the use of epoxy resin, addition of an excessive amount of epoxy resin is undesirable because it is accompanied by a decrease in heat resistance.

Although the resin composition of the invention may contain no curing agent for epoxy resin, a Lewis acid such as boron trifluoride amine complex and the like may be added thereto, if necessary.

The resin composition of the invention can easily be cured by heat. The cure can be accelerated by adding a radical polymerization initiator such as azo compound, organic peroxide and the like or an ionic catalyst such as tertiary amine, quaternary ammonium salt, imidazole compound, boron trifluorideamine salt and the like.

The resin composition of the invention can be made into a casting material or a molding material by compounding it with various fillers and reinforcing materials at a relatively low temperature by means of mixer, kneader, roll or the like. Further, the resin composition of the invention can also be used as a laminating material by dissolving it into a solvent and coating the resulting solution on various reinforcing fibers such as glass fiber, carbon fiber and the like.

The resin composition of the invention is useful as casting material, impregnating material, laminating material and molding material because it is a thermosetting resin composition excellent in processability and heat resistance.

As the fiber usable in the invention as reinforcing material, inorganic and organic fibers having a tensile strength of 0.5 GPa or above and a Young's modulus of 50 GPa or above, such as carbon fiber, graphite fiber, glass fiber, silicon carbide fiber, alumina fiber, titania fiber, boron fiber, aromatic polyamide fiber, aromatic polyester fiber., polybenzimidazole fiber and the like, can be referred to. Among these fibers, carbon fiber and alumina fiber are particularly preferable, because they can make the most of the characteristic feature of the resin composition of the invention and can exhibit an outstanding effect brought about by the composite formation. Alumina fiber can be produced according to the process mentioned in Japanese Patent Publication No. 12,736/76, Japanese Patent Publication No. 13,768/76, etc. These fibers can be used in the form of continuous two, woven fabric, short fiber, whisker, etc. For some purposes, two or more kinds of fibers or plural fibers different in shape may be used in combination to exhibit a good effect. Further, in addition to the reinforcing fibers, granular materials of talc, mica, calcium carbonate, alumina hydrate, silicon carbide, carbon black, silica or the like may also be mixed into the composition. This is effective for improving the viscosity behavior of the resin composition and thereby facilitating the molding procedure of composite material and for improving the properties, such as compression strength and the like, of the composite material.

The composite material of the invention can be produced according to various processes. As one example of the production processes, there can be referred to a process which comprises laminating plural sheet-formed prepregs and then heating and pressing the laminate in an autoclave to form a composite material. As used herein, the term "prepregs" means a product prepared by impregnating a reinforcing fiber with the resin composition. It can take various forms such as sheet, pellet, continuous tow, etc. In the sheet-formed prepreg, the reinforcing fiber takes a form of withdrawn and arranged continuous tows, or a form of mat-formed entanglement of short fibers, or a form of woven fabric. A sheet-formed prepreg prepared by superposing several sheets different in structure are also a useful material. A product prepared by impregnating continuous tows of reinforcing fiber with the resin composition and a product prepared by bundling several units thus prepared are also useful.

In these prepregs, the content of fiber is generally 5 to 70% by volume and preferably 10 to 60% by volume.

The prepreg can be produced by impregnating an assembly of reinforcing fiber with resin composition or its partially reacted product (optionally dissolved or melted to form a liquid material) or by mixing the reinforcing fiber with the resin composition and optionally heating the resulting mixture to make a partial reaction progress. Owing to the excellent flow property and readily controllable curing behavior of the resin composition of the invention, the prepreg obtained in the above-mentioned manner is much superior to the prior ones using heat resistant resins, such as polyimide in moldability. Therefore; molded product of composite material having no vacancies can easily be produced therefrom. Another example of the production process is the filament winding process which comprises passing a reinforcing fiber formed into a continuous tow through an optionally dissolved or melted liquid resin composition, winding the fiber on a frame and then heating and curing it. Apart from above, a process which comprises laminating a chopped strand, a mat or a woven fabric of reinforcing fiber in a mold, impregnating the laminate with a resin composition and then heating and curing it to give a molded product is also possible. From the viewpoint of manifesting good properties, these composite materials preferably have a fiber content of 3 to 70% by volume and particularly 10 to 60% by volume.

The composite material of the invention is easy to mold. In this composite material, the reinforcing fiber and the matrix are sufficiently bonded together. Thus, it exhibits excellent mechanical strength and hot water resistance at high temperatures and is quite useful as a material for automobile, space aircrafts and mechanical parts.

Next, referring to the following non-limitative referential examples and examples, the invention will be illustrated in more detail. In the examples, "parts" means "parts by weight".

REFERENTIAL EXAMPLE 1

Partial Allyl-etherification

Into a reactor equipped with a thermometer, a stirrer, a dropping funnel and a reflux condenser, 236 parts (2 equivalents) of o-cresol novolac resin having a softening point of 90° C. and 840 pats of dimethylformamide, as a reaction solvent, were charged. After the resin had completely dissovled, 62 parts (1.5 equivalents) of 97% solution of sodium hydroxide was added and thoroughly stirred. Then, 120 parts (1.58 equivalents) of allyl chloride was dropwise added over a period of one hours while keeping the system temperature at 40° C. Then, the reaction system was heated to 50° C. and kept at this temperature for five hours. After distilling off the dimethylformamide, 300 parts of toluene was charged and the resin was dissovled thereinto, after which the inorganic salt was removed by washing with water and filtration and the filtrate was concentrated. Thus, 282 parts of a red-orange colored viscous liquid resin having no nucleus-substituting allyl group was obtained. Degree of allyl-etherification 75%; OH equivalent 592 g/eq.

Epoxidation

Into a reactor equipped with a thermometer, a stirrer, a dropping funnel and a reaction water recovery device, 236.8 parts (0.4 equivalent) of the partially allyl-etherified product obtained above and 370 parts (4.0 equivalents) of epichlorohydrin were charged. After adjusting the system pressure to 150 mm Hg, the system was slowly heated until it began to boil. While boiling it, 35 parts (0.42 equivalent) of 48% aqueous solution of sodium hydroxide was slowly added over a period of 2 hours at a controlled reaction temperature of 620C. During the reaction, water was removed from the system in the form of an azeotropic mixture with epichlorohydrin and the epichlorohydrin was circulated. After completing the dropping of sodium hydroxide, the same conditions as above were maintained for an additional 30 minutes.

Next, sodium chloride was filtered off from the reaction mixture and the filtrate was concentrated to obtain 240 parts of a yellow-orange colored viscous liquid having an epoxy equivalent of 658 g/eq. This product was named "AEN-1".

REFERENTIAL EXAMPLE 2

Partial Allyl-etherification

The procedure of Referential Example 1 was repeated, except that the dimethylformamide was replaced with 600 parts of dimethyl sulfoxide, and 41 parts (1.0 equivalent) of 97% sodium hydroxide solution and 82 parts (1.08 equivalents) of allyl chloride were used. As the result, 262 parts of a red-brown colored semi-solid resin having no nucleus-substituting allyl group was obtained. Degree of allyl-etherification 50%; OH equivalent 276 g/eq.

Epoxidation

The procedure of Referential Example 1 was repeated, except that 220.8 parts (0.8 equivalent) of the above-mentioned partially allyl-etherified product, 444 parts (4.8 equivalents) of epichlorohydrin and 70 parts (0.84 equivalent) of 48% aqueous solution of sodium hydroxide were used. As the result, 248 parts of a yellow-orange colored semi-solid resin having an epoxy equivalent of 348 g/eq was obtained. It was named "AEN-2".

EXAMPLE 1

Into 700 parts of N,N-dimethylformamide (DMF) were dissolved 200 parts of AEN-1 obtained in Referential Example 1 and 269 parts of N,N'-diphenylmethani bismaleimide. The resulting solution was impregnated into glass cloth (KS-1600, A-1100, manufactured by Kanebo K.K.). Then it was treated in an oven at 180° C. for 10 minutes to form a prepreg. Six sheets of the prepreg were superposed, molded in a press at 180° C. under a pressure of 50 kg/cm$^2$ for 60 minutes and then post-cured in an oven at 180° C. for 2 days to form a laminate. Similarly, a copper-lined laminate having a thickness of 1 mm was prepared from six sheets of the prepreg and a copper foil (manufactured by Furukawa Circuit Foil K.K., TAI-treated, 35 microns in thickness). Properties of the laminates were as shown in Table 1.

EXAMPLE 2

Into 900 parts of DMF were dissolved 336 parts of AEN-2 obtained in Referential Example 2 and 269 parts of N,N'-diphenylmethane bismaleimide, after which the procedure of Example 1 was repeated to obtain a laminate and a copper-lined laminate. Their properties were as shown in Table 1.

EXAMPLE 3

At 180° C., 336 parts of AEN-2 obtained in Referential Example 2, 55 parts of Bisphenol A and 0.2 part of 2,4,6-tris(dimethylaminomethyl)-phenol were reacted for 30 minutes. Then, 269 parts of N,N'-diphenylmethane bismaleimide was added, and the mixture was dissolved into 990 parts of DMF. Using the resulting solution, a laminate and a copper-lined laminate were prepared in the same manner as in Example 1. Their properties were as shown in Table 1.

COMPARATIVE EXAMPLE 1

A mixture consisting of 179 parts of N,N'-diphenylmethane bismaleimide and 37 parts of 4,4'-diphenylmethane was stirred at 180° C. for 5 minutes. Then, 320 parts of DMF was added to prepare a uniform solution. Using the solution, a laminate and a copper-lined laminate were prepared in the same-manner as in Example 1. Their properties were as shown in Table 1.

TABLE 1

|  |  | Example 1 | Example 2 | Example 3 | Comparative Example 1 |
|---|---|---|---|---|---|
| $T_g$ | °C. | 254 | 234 | 220 | 220 |
| Water absorption (boiling for 48 hrs.) | % | 1.40 | 0.97 | 1.31 | 1.57 |
| Volume resistivity (ordinary state) | Ωm | $1.1 \times 10^{16}$ | $1.9 \times 10^{16}$ | $1.3 \times 10^{16}$ | $7.6 \times 10^{15}$ |
| Ditto (after boiling for 48 hrs.) | Ωm | $2.0 \times 10^{14}$ | $7.0 \times 10^{14}$ | $2.8 \times 10^{14}$ | $1.1 \times 10^{14}$ |
| Peeling strength | Kg/m | 165 | 180 | 170 | 140 |

As is apparent from Table 1 the composition of the invention gives a cured product having excellent heat resistance, water resistance, electrical insulating property and adhesive property. Further, the composition of the invention is excellent in solubility in solvents and so excellent in processability as to cure at a temperature of about 180° C.

REFERENTIAL EXAMPLE 3

Into a reactor equipped with a thermometer, a stirrer, dropping funnel and a reflux condenser were charged 118 parts (1 equivalent) of o-cresol novolac resin having a softening point of 100° C. and 155 parts of acetone as a reaction solvent. After the resin had completely dissolved, 133 parts (1.1 equivalents) of allyl bromide was added and thoroughly stirred. Then, 157 parts (1.1 equivalents) of 28% aqueous solution of sodium hydroxide was dropwise added over a period of 2 hours while keeping the system temperature at 60° C., and then the system was heated to 60° C. and kept at this temperature for 3 hours. Then, the reaction mixture was separated into layers, the aqueous layer was removed, acetone and the reacted allyl bromide were distilled off, and 155 parts of toluene was added to dissolve the resin. Then, the slight quantity of inorganic salt was washed away with water and filtered off, and the filtrate was concentrated to obtain 154 parts of a light yellow viscous liquid resin having a degree of allyl etherification of 102% and a OH content of 0.2%.

EXAMPLE 4

At 180° C., 50 parts of the resin obtained in Referential Example 1 (hereinafter, referred to as ALN), 85 parts of N,N'-4,4'-diphenylmethane-bismaleimide (hereinafter, referred to as BMI) and 50 parts of Sumiepoxy ESCN-195XL (o-cresol novolac type epoxy resin, softening point 70° C. epoxy equivalent 197 g/eq. manufactured by Sumitomo Chemical Co., Ltd.) were heated and melted. Then, the molten mixture was cured at 230° C. Glass transition temperature (hereinafter, referred to as $T_g$) and bending strength of the cured product thus obtained are shown in Table 2.

EXAMPLES 5 TO 9

A mixture consisting of 65 parts of ALN, 35 parts of epoxy resin shown in Table 2 and 107 parts of BMI was heated and melted at 180° C. and then cured at 230° C. for 3 hours. $T_g$ and bending strength of the cured product are shown in Table 2.

TABLE 2

|  |  | Example 4 | Example 5 | Example 6 | Example 7 | Example 8 | Example 9 |
|---|---|---|---|---|---|---|---|
| ALN | parts | 50 | 65 | 65 | 65 | 65 | 65 |
| BMI | " | 85 | 107 | 107 | 107 | 107 | 107 |
| Sumiepoxy ESCN-195XL | " | 50 | 35 | — | — | — | — |
| Sumiepoxy ESA-014 | " | — | — | 35 | — | — | — |
| Sumiepoxy ESA-011 | " | — | — | — | 35 | — | — |
| Sumiepoxy ELA-128 | " | — | — | — | — | 35 | — |
| Sumiepoxy ESB-400 | " | — | — | — | — | — | 35 |
| Curing conditions 230° C. × 3 hrs. |  |  |  |  |  |  |  |
| Tg | °C. | 296 | 307 | 290 | 303 | 300 | 295 |
| Bending strength (20° C.) | kg/mm² | 11.1 | 11.0 | 10.8 | 9.8 | 9.2 | 7.1 |
| Bending strength (230° C.) | " | 5.8 | 6.0 | 6.9 | 5.9 | 5.0 | 5.2 |
| Bending modulus (20° C.) | " | 390 | 400 | 374 | 406 | 436 | 406 |
| Bending modulus (230° C.) | " | 230 | 235 | 222 | 200 | 195 | 239 |

(Notes)
Sumiepoxy ESA-014 (Bisphenol A type epoxy resin, epoxy equivalent 950 g/eq. manufactured by Sumitomo Chemical Co., Ltd.)
Sumiepoxy ESA-011 (Bisphenol A type epoxy resin, epoxy equivalent 485 g/eq. manufactured by Sumitomo Chemical Co., Ltd.)
Sumiepoxy ELA-128 (Bisphenol A type epoxy resin, epoxy equivalent 187 g/eq. manufactured by Sumitomo Chemical Co., Ltd.)
Sumiepoxy ESB-400 (Tetrabromo-Bisphenol A type epoxy resin, epoxy equivalent 396 g/eq. manufactured by Sumitomo Chemical Co., Ltd.)

EXAMPLE 10

The composition of Example 2 shown in Table 4 was uniformly dissolved into N,N'-dimethylformamide to obtain a varnish of which non-volatile matter content was adjusted to 60% by weight. A glass cloth (KS-1600, A-1100, manufactured by Kanebo K.K.) was impregnated with the varnish and treated in an oven at 150° C. for 7 minutes to obtain a prepreg. Six sheets of the prepreg were pressed together with a copper foil (Furukawa circuit Foil K.K., TAI-treated, 35 microns) at 200° C. under a pressure of 50 kg/cm² for 3 hours to obtain a copper-lined laminate having a thickness of 1 mm. Properties of the laminate were as shown in Table 2.

EXAMPLE 11

Using the composition of Example 9, a copper-lined laminate was prepared under the same conditions as in Example 10. Properties of the laminate thus obtained were as shown in Table 3.

COMPARATIVE EXAMPLE 2

A copper-lined laminate was prepared by repeating the procedure of Example 10, except that Sumiepoxy ESCN-195XL was not used in the composition of Example 5. Properties of the laminate thus obtained were as shown in Table 3.

COMPARATIVE EXAMPLE 3

A varnish was prepared by dissolving 90 parts of Sumiepoxy ESB-500 (tetrabromo-Bisphenol A type epoxy resin, epoxy equivalent 480 g/eq, bromine content 20.5%, manufactured by Sumitomo Chemical Co., Ltd.). 10 parts of Sumiepoxy ESCN-195XL, 3.8 parts of dicyandiamide and 0.1 part of 2-ethyl-4-methylimidazole into a mixture consisting of 30 parts of N,N'-dimethylformamide and 40 parts of methyl ethyl ketone. A glass cloth (WE18K105BZ2, manufactured by Nitto Boseki K.K.) was impregnated with the varnish and treated in an oven at 150° C. for 7 minutes to obtain a prepreg. Six sheets of the prepreg were pressed together with copper foil (Purukawa Circuit Foil K.K., TAI-treated, 35 microns) at 160° C. under a pressure of 50 kg/cm² for 2 hours to obtain a copper-lined laminate having a thickness of 1 mm. Properties of the laminate were as shown in Table 2.

COMPARATIVE EXAMPLE 4

One hundred parts of a thermosetting resin consisting of 1 mole of BMI and 0.4 mole of methylenedianiline (hereinafter, referred to as DMA) was dissolved into 90 parts of N,N'-dimethylformamide. Using this solution, a copper-lined laminate was prepared under the same conditions as in Example 10. Properties of the laminate were as shown in Table 3.

hour while keeping the system temperature at 60° C., after which the mixture was kept at that temperature for 5 hours. After distilling off the dimethylformamide, 155 parts of toluene was added to dissolve the resin, the inorganic salt was removed by washing with water and filtration, and the filtrate was concentrated to obtain 282 parts of a red-orange colored viscous liquid resin having no nucleus-substituting allyl group. Degree of allyl etherification was 75%. and OH equivalent was 592 g/eq.

Epoxidation

Into a reactor equipped with a thermometer, a stirrer, a dropping funnel and a reflux condenser were charged 236.8 parts (0.4 equivalent) of partially allyl-etherified product obtained above and 370 parts (4.0 equivalents) of epichlorohydrin. After adjusting the pressure of reaction system to 150 mm Hg, the system was slowly heated. While boiling the system, 35 parts (0.42 equivalent) of 48% aqueous solution of sodium hydroxide was slowly added thereto over a period of 2 hours at a controlled reaction temperature of 60° C. During the reaction, water was removed from the reaction system in the form of an azeotropic mixture with epichlorohydrin, and the epichlorohydrin was circulated. After completely dropping the sodium hydroxide, the same conditions as above were maintained for an additional 30 minutes.

Next, sodium chloride was filtered off from the reaction mixture#and the filtrate was concentrated. Thus, 240 parts of a yellow-orange colored viscous liquid product having an epoxy equivalent of 658 g/eq was obtained. It was named "AEN-1".

REFERENTIAL EXAMPLE 5

TABLE 3

| | | Example 10 | Example 11 | Comparative Example 2 | Comparative Example 3 | Comparative Example 4 |
|---|---|---|---|---|---|---|
| Tg | °C. | 278 | 271 | 270 | 134 | 216 |
| Coefficient of thermal expansion (in Z-direction, 20–260° C.) | % | 1.52 | 1.54 | 1.50 | 4.99 | 2.08 |
| Water absorption in boiling (24 hrs.) | % | 1.17 | 1.04 | 1.44 | 1.40 | 1.29 |
| Peeling strength (20° C.) | kg/m | 154 | 156 | 98 | 210 | 144 |
| Bending strength (20° C.) | kg/mm² | 38 | 36 | 32 | 44 | 39 |
| Bending strength (150° C.) | " | 30 | 30 | 28 | 12 | 25 |
| Volume resistivity (in ordinary state) | cm | $2.9 \times 10^{15}$ | $3.3 \times 10^{15}$ | $9.4 \times 10^{14}$ | $3.5 \times 10^{15}$ | $2.6 \times 10^{15}$ |
| Ditto (after boiling for 24 hrs) | " | $6.8 \times 10^{14}$ | $8.4 \times 10^{14}$ | $8.1 \times 10^{10}$ | $1.7 \times 10^{13}$ | $4.2 \times 10^{14}$ |

From the examples presented above, it is apparent that the thermosetting resin composition according to the invention gives a cured product excellent in heat resistance, thermal dimensional stability, electrical properties, etc.

REFERENTIAL EXAMPLE 4

Partial Allyl-etherification

Into a reactor equipped with a thermometer, a stirrer, a dropping funnel and a reflux condenser were charged 236 parts (2 equivalents) of o-cresol novolac resin having a softening point of 90° C. and 840 parts of dimethylformamide as a reaction solvent. After the resin had dissolved completely, 62 parts (1.5 equivalents) of 97% solution of sodium hydroxide was added and thoroughly stirred. Then, 120 parts (1.58 equivalents) of allyl chloride was dropwise added over a period of one

Partial Allyl-etherification

The procedure of Referential Example 4 was repeated, except that the dimethylformamide was replaced with 600 parts of dimethyl sulfoxide, and 41 parts (1.0 equivalent) of 97% solution of sodium hydroxide and 82 parts (1.08 equivalents) of allyl chloride were used. As the result, 262 parts of a red-brown colored semi-solid resin having no nucleus-substituting allyl group was obtained. Degree of allyl etherification was 50%, and OH equivalent was 276 g/eq.

Epoxidation

The procedure of Referential Example 4 was repeated, except that 220.8 parts (0.8 equivalent) of the partially allyl-etherified product obtained above, 444 parts.(4.8 equivalents) of epichlorohydrin and 70 parts (0.84 equivalent) of 48% aqueous solution of sodium hydroxide were used. As the result, 248 parts of a yellow-orange colored semi-solid resin having an epoxy equivalent of 348 g/eq was obtained. It was named "AEN-2".

EXAMPLE 12

A mixture consisting of 100 parts of the resin obtained in Referential Example 4 (AEN-1) and 135 parts of N,N'-4,4'-diphenylmethane-bismaleimide (manufactured by Mitsui Toatau Kagaku K.K., referred to as "BMI") was stirred in an oil bath preheated to 160° C. for 30 minutes to obtain a uniform liquid resin. It was used as a resin composition for making a prepreg. While maintaining the resin at a temperature of 120° C. by means of a hot bath, a cabon fiber (Magnamite®AS4, manufactured by Sumitomo Hercules K.K.) was impregnated with the resin and then wound on a drum covered with silicone release paper. The amount of the impregnating resin was controlled by passing the carbon fiber between two metallic rods of which gap could be controlled.

The carbon fiber wound on the release paper was cut open and taken off from the drum to obtain a prepreg. The prepreg contained 35% by weight of the resin, and its fiber METSUKE (weight per unit area) was 150 g/m².

The prepreg thus obtained was cut into pieces, laminated, and then set into a form suitable for autoclave molding by the use of a nylon vacuum bag. The set product was introduced into an autoclave and heated at a speed of 2° C./minute. When the temperature had reached 160° C., the pressure was elevated to 6 kg/cm². After the temperature had reached 180° C., this temperature was maintained for 2 hours to produce a cured board. The cured board was post-cured in a hot air oven at 210° C. for 4 hours to obtain a one-directionally reinforced composite material containing 60% by volume of carbon fiber. It was named Sample A. This molded product was examined by means of a scanning electron microscope to ascertain that it contained no vacancies. A smaller specimen was cut out of Sample A and it was dipped in hot water (100° C.) for 48 hours. This was named Sample B. On Sample A and Sample B, properties were measured. The results were as shown in Table 4. It is apparent from Table 4 that the composite material of the invention is quite excellent in heat resistance and hot water resistance.

EXAMPLE 13

The procedure of Example 12 was repeated, except that 336 parts of the resin obtained in Referential Example 5 (AEN-2) was mixed with 269 parts of N,N'-4,4'-phenylmethane-bismaleimide (manufactured by Mitsui Toatsu K.K.). As the result, a one-directionally reinforced composite material containing 60% by volume of carbon fiber was obtained. It was named Sample C. A specimen which had been cut out of sample C and dipped in hot water (100° C.) for 48 hours was named Sample D. on Sample C and Sample D. properties were measured. The results were as shown in Table 4.

TABLE 4

| | Unit | Sample A | Sample B | Sample C | Sample D |
|---|---|---|---|---|---|
| $T_g$ | (°C.) | 308 | — | 275 | — |
| Interlaminar shear strength (25° C.) | kg/mm² | 11.8 | 11.5 | 12.9 | 12.1 |
| Interlaminar shear strength (180° C.) | " | 8.7 | 6.8 | 8.5 | 6.6 |
| Interlaminar shear strength (230°) | " | 7.9 | 4.3 | 7.3 | 4.5 |
| 0°-Bending strength (25° C.) | " | 208 | 209 | 217 | 216 |
| 0°-Bending strength (180° C.) | " | 176 | 151 | 181 | 156 |
| 0°-Bending strength (230° C.) | " | 154 | 140 | 146 | 140 |
| 90°-Bonding strength (25° C.) | " | 7.8 | 7.5 | 9.8 | 9.7 |
| 90°-Bonding strength (180° C.) | " | 6.2 | 3.9 | 7.5 | 4.7 |
| 90°-Bonding strength (230° C.) | " | 4.9 | 3.1 | 6.7 | 4.2 |

Methods of measurements:
$T_g$ — TMA (thermal mechanical analysis)
Interlaminar shear strength — ASTM D-2344
Bending strength — ASTM D-790

EXAMPLE 14

A mixture consisting of 336 parts of the resin obtained in Referential Example 5 (AEN-2), 55 parts of Bisphenol A and 0.2 part of 2,4,6-tris(dimethylaminomethyl)-phenol was reacted at 180° C. for 30 minutes. Then, 269 parts of N,N'-4,4'-diphenylmethane bismaleimide (manufactured by Mitsui Toatsu K.K.) was added and the mixture was stirred in an oil bath preheated to a temperature of 160° C. for 30 minutes to obtain a uniform liquid resin. It was used as a resin composition for forming a prepreg. Using the resin composition, a one- directionally reinforced composite material containing 60% by volume of carbon fiber was prepared by the same procedure as in Example 11.

It was named Sample E. A sample which had been cutout of Sample E and dipped in hot water (100° C.) for 48 hours was named Sample F. Properties of Sample E and Sample F were measured to obtain the result shown in Table 5.

COMPARATIVE EXAMPLE 5

A resin composition for making prepreg was prepared by mixing 120 parts (1 equivalent) of N,N'-tetraglycidylaminodiphenylmethane (Sumiepoxy®ELM 434, manufactured by Sumitomo Chemical Co., Ltd.) and 50 parts (0.8 equivalent) of diaminodiphenyl sulfone (Sumiepoxy®S, manufactured by Sumitomo Chemical Co., Ltd.) as a curing agent and kneading the mixture at 100° C. for 5 minutes by means of rolls.

In the same manner as in Example 12, a carbon fiber (the same as in Example 12) was impreganted with the resin composition to make a prepares, and it was molded by means of an autoclave to obtain a one-directionally reinforced composite material containing 60% by volume of carbon fiber.

It was named Sample G. A specimen which had been cut out of Sample G and dipped in hot water (100° C.) for 48 hours was named Sample H.

Properties of Sample G and Sample H were measured to obtain the results shown in Table 5.

TABLE 5

|  | Unit | Sample E | Sample F | Sample G | Sample H |
| --- | --- | --- | --- | --- | --- |
| $T_g$ | (°C.) | 255 | — | 225 | — |
| Interlaminar shear strength (25° C.) | kg/mm$^2$ | 12.3 | 11.9 | 12.5 | 10.5 |
| Interlaminar shear strength (180° C.) | " | 7.1 | 4.9 | 5.5 | 2.9 |
| Interlaminar shear strength (230° C.) | " | 4.5 | 3.7 | 2.2 | Unmeasurable |
| 0°-Bending strength (25° C.) | " | 219 | 215 | 208 | 190 |
| 0°-Bending strength (180° C.) | " | 162 | 142 | 138 | 22 |
| 0°-Bending strength (230° C.) | " | 144 | 133 | 30 | Unmeasurable |
| 90°-Bonding strength (25° C.) | " | 9.4 | 9.6 | 10.0 | 7.3 |
| 90°-Bonding strength (180° C.) | " | 7.1 | 4.6 | 6.5 | Unmeasurable |
| 90°-Bonding strength (230° C.) | " | 6.5 | 4.1 | 1.2 | Unmeasurable |

Methods of measurements:
$T_g$ — TMA (thermal mechanical analysis)
Interlaminar shear strength — ASTM D-2344
Bending strength — ASTM D-790

EXAMPLE 15

A mixture consisting of 100 parts of the resin obtained in Referential Example 4 (AEN-1) and 135 parts of N,N'-4,4'-diphenylmethane bismaleimide (the same as in Example 1) was stirred in an oil bath preheated to 160° C. for 30 minutes to obtain a uniform liquid resin composition. It was used as a resin composition for use in the filament winding process.

The resin composition had a viscosity of 20 poises or below as measured at 100° C. by means of cone/plate type viscometer, and its pot life was 8 hours or longer.

Next, in order to evaluate the performances of the resin composition, a carbon fiber (the same as in Example 12) was wound on a cylindrical mandrel thoroughly coated with a demolding agent according to the filament winding process, while continuously impregnating it with said liquid resin composition. The angle of winding was adjusted to 90° from the mandrel axis.

Then, the tubular product consisting of the carbon fiber impregnated with the resin composition and the mandrel was cured for 4 hours in an oven kept at 210° C. while continuously rotating it. After slowly cooling it, the mandrel was withdrawn to obtain a fiber-reinforced tubular product.

The cured product was cut into pieces and the sections were examined by means of scanning electron microscope to confirm the absence of vacancies. The content of carbon fiber in this product was 58% by volume. The tubular product thus obtained was cut perpendicularly with regard to the direction of mandrel axis and its strength was examined by the Nolring method. The results were as shown in Table 6.

TABLE 6

|  | 25° C. | 180° C. | 230° C. |
| --- | --- | --- | --- |
| Tensile strength (kg/mm$^2$) | 200 | 167 | 153 |
| Tensile modulus (t/mm$^2$) | 12.4 | 12.0 | 11.4 |

Nolring method for the measurement of tensile strength: ASTM D-2290

According to TMA (thermal mechanical analysis), its glass transition temperature was 310° C. Specimens were cut out of this sample, and some of them were dipped in hot water at 100° C. for 48 hours. Both the specimens dipped in hot water and the specimens not dipped in hot water were subjected to DMA (dynamic mechanical analysis). As the result, there was found no difference between the specimens dipped in hot water and those not dipped in hot water.

EXAMPLE 16

A one-directionally reinforced composite material was prepared by repeating the procedure of Example 12, except that the carbon fiber was replaced with an alumina fiber (manufactured by Sumitomo Chemical Co., Ltd.). After molding and cure, a one-directionally reinforced composite material containing 60% volume of alumina fiber was obtained. It was named Sample I. A specimen was cut out of Sample I and it was dipped in hot water (100° C.) for 48 hours to prepare Sample J. Properties of Sample I and Sample i were measured to obtain the results shown in Table 7.

COMPARATIVE EXAMPLES 6

A one-directionally reinforced composite material containing 60% by volume of alumina fiber was obtained by repeating the procedure of Comparative Example 1, except that an alumina fiber (manufactured by Sumitomo Chemical Co., Ltd.) was used as the reinforcing fiber.

It was named Sample K. A specimen cut out of sample K and dipped in hot water (100° C.) for 48 hours was named Sample L. Properties of Sample K and Sample L were measured to obtain the results shown in Table 7.

TABLE 7

|  | Unit | Sample I | Sample J | Sample K | Sample L |
| --- | --- | --- | --- | --- | --- |
| Interlaminar shear strength (25° C.) | kg/mm$^2$ | 12.3 | 12.3 | 12.4 | 11.6 |
| Interlaminar shear strength (180° C.) | " | 9.0 | 6.0 | 5.4 | 2.2 |
| Interlaminar shear strength (230° C.) | " | 4.5 | 3.7 | 2.2 | Unmeasurable |
| Bending strength (25° C.) | " | 165 | 158 | 155 | 148 |
| Bending strength (180° C.) | " | 165 | 133 | 65 | 12 |
| Bending strength (230° C.) | " | 152 | 107 | 18 | Unmeasurable |

Methods of measurements:
Interlaminar shear strength — ASTM D-2344
Bending strength — ASTM D-790

REFERENTIAL EXAMPLE 7

Into a reactor equipped with a thermometer, a stirrer, a dropping funnel and a reflux condenser were charged 118 parts (1 equivalent) of an o-cresol novolac resin having a softening point of 100° C. and 155 parts of acetone as a reaction solvent. After the resin had dissolved completely, 133 parts (1.1 equivalents) of allyl bromide was added and thoroughly stirred. Then, 157 parts (1.1 equivalents) of 28% aqueous solution of sodium hydroxide was dropwise added over a period of 2 hours while keeping the system temperature at 60° C., after which the mixture was kept at this temperature for 3 hours. After separating the reaction mixture into layers, the aqueous layer was removed, the acetone and the unreacted allyl bromide were distilled off, and then 155 parts of toluene was charged to dissolve the resin. Then the slight quantity of inorganic salt was removed by washing with water and filtration and the filtrate was concentrated. Thus, 154 parts of a light yellow colored viscous liquid resin was obtained. Degree of allyl-etherification 102%, OH content 0.2%.

EXAMPLE 17

A mixture consisting of 65 parts of the resin obtained in Referential Example 7 (referred to as ALN), 110 parts of N,N'-4,4'-diphenylmethane-bismaleimide (manufactured by Mitsui Toatsu Kagaku K.K., referred to as BMI) and 35 parts of o-cresol novolac type epoxy resin (Sumiepoxy®ESCN195-XL, manufactured by Sumitomo Chemical Co., Ltd.) was stirred in an oil bath preheated to 160° C. for a period of 30 minutes to obtain a uniform liquid resin. It was used as the resin composition for making a prepreg. Then, while maintaining the resin at a temperature of 120° C. by the use of a hot bath, a carbon fiber (Magnamite®AS4, manufactured by Sumitomo Hercules Co., Ltd.) was impregnated with the resin and then wound on a drum covered with a silicone release paper. The amount of the impregnating resin was controlled by passing the carbon fiber between two metallic rods of which gap was controllable.

The carbon fiber wound on the release paper was cut open and taken off from the drum to obtain a prepreg. The prepreg contained 35% by weight of the resin and its fiber METSUKE was 150 g/m². The prepreg thus obtained was cut into pieces, laminated and set so as to give a material suitable for the molding process in autoclave by the use of a nylon-made vacuum bag. The set product was introduced into an autoclave and the temperature was elevated at a rate of 2° C./minute. When the temperature had reached 160° C., the pressure was elevated to 6 kg/cm². After the temperature had reached 180° C., this temperature was maintained for 2 hours to obtain a cured board. The cured board was post-cured in a hot air oven at 210° C. for 4 hours to obtain a one-directionally reinforced composite material containing 60% by volume of carbon fiber. It was named Sample M. A specimen cut out of Sample M and dipped in hot water at 100° C. for 48 hours was named Sample N. Properties of Sample M and sample N were measured to obtain the results shown in Table 8. It is apparent from Table 8 that the composite material of the invention is quite excellent in heat resistance and hot water resistance.

EXAMPLE 18

A mixture consisting of 65 parts of the resin obtained in Referential Example 7, 110 parts of N,N'-4,4'-diphenylmethanebismaleimide (manufactured by Mitsui Toatsu Kagaku K.K.) and 35 parts of N,N'-tetraglycidyl-diaminodiphenylmethane (sumiepoxy®ELM434; manufactured by Sumitomo Chemical Co., Ltd.) was stirred in an oil bath previously heated to 160° C. for 30 minutes to obtain a uniform liquid resin. It was used as the resin composition for making a prepreg. Then, a prepreg of the resin was prepared by carrying out molding and cure in the same manner as in Example 17 to obtain a one-directioally fiber-reinforced composite material containing 60% by volume of carbon fiber.

It was named Sample O. A specimen cut out of Sample O and dipped in hot water (100° C.) for 48 hours was named Sample P. Properties of Sample O and Sample P were measured to obtain the results shown in Table 8.

TABLE 8

|  | Unit | Sample M | Sample N | Sample O | Sample P |
|---|---|---|---|---|---|
| Interlaminar shear strength (25° C.) | kg/mm² | 12.4 | 11.9 | 13.4 | 12.6 |
| Interlaminar shear strength (180° C.) | " | 8.9 | 7.1 | 10.2 | 7.3 |
| Interlaminar shear strength (230° C.) | " | 8.2 | 6.7 | 9.5 | 6.9 |
| 0°-Bending strength (25° C.) | " | 212 | 207 | 221 | 215 |
| 0°-Bending strength (180° C.) | " | 176 | 151 | 188 | 152 |
| 0°-Bending strength (230° C.) | " | 154 | 129 | 166 | 149 |
| 90°-Bonding strength (25° C.) | " | 8.3 | 7.7 | 9.0 | 8.3 |
| 90°-Bonding strength (180° C.) | " | 6.7 | 3.9 | 7.5 | 4.5 |
| 90°-Bonding strength (230° C.) | " | 6.1 | 3.1 | 6.6 | 3.9 |

Methods of measurements:
Interlaminar shear strength — ASTM D-2344
Bending strength — ASTM D-790

COMPARATIVE EXAMPLE 7

A mixture consisting of 120 parts (1 equivalent) of N,N'-tetraglycidyl-diaminodiphenylmethane (Sumiepoxy ® ELM434, manufactured by Sumitomo Chemical Co., Ltd.) as an epoxy resin and 50 parts (0.8 equivalent) of diaminodiphenyl sulfone (Sumicure ® S, manufactured by Sumitomo Chemical Co., Ltd.) was kneaded by means of rolls at 100° C. for 5 minutes to prepare a resin composition for making a prepreg.

In the same manner as in Example 17, a carbon fiber (the same carbon fiber as in Example 17) was impregnated with this resin composition to prepare a prepreg and it was formed in autoclave to obtain a one-directionally reinforced composite material containing 60% by volume of carbon fiber.

It was named Sample A specimen cut out of Sample Q and dipped in hot water (100° C.) for 48 hours was named Sample R.

Properties of Sample Q and Sample R were measured to obtain the results shown in Table 9.

TABLE 9

|  | Sample Q | Sample R |
|---|---|---|
| Interlaminar shear strength (25° C.) | 12.5 | 10.5 |
| Interlaminar shear strength (180° C.) | 5.5 | 2.9 |
| Interlaminar shear strength (230° C.) | 2.2 | Unmeasurable |
| 0°-Bending strength (25° C.)* | 208 | 190 |
| 0°-Bending strength (180° C.) | 138 | 22 |
| 0°-Bending strength (230° C.) | 30 | Unmeasurable |
| 90°-Bending strength (25° C.)* | 10.0 | 7.3 |
| 90°-Bending strength (180° C.) | 6.5 | Unmeasurable |

TABLE 9-continued

|  | Sample Q | Sample R |
|---|---|---|
| 90°-Bending strength (280° C.) | 1.2 | Unmeasurable |

Methods of measurement:
Interlaminar shear strength — ASTM D-2344
Bending strength — ASTM D-790-80
*: Unit kg/mm$^2$

EXAMPLE 19

A mixture consisting of 65 parts of the resin obtained in Referential Example 7 (ALN), 110 parts of N,N'-4,4'-diphenylmethane bismaleimide (the same as in Example 17) and 35 parts of Sumiepoxy ®ELM434 (manufactured by Sumitomo Chemical Co., Ltd.) was stirred for 30 minutes in an oil bath previously heated to 160° C. to obtain a uniform liquid resin composition. It was used as a resin composition for use in filament winding molding process.

The resin composition had a viscosity of 20 poises or below as measured at 100° C. with cone/plate type viscometer, and its pot life was 8 hours or longer.

Next, in order to evaluate the performances of the resin composition, a carbon fiber (the same as in Example 17) was continuously impregnated with the liquid resin composition kept at 100° C. and then it was wound up on a cylindrical mandrel sufficiently coated with a demolding agent. The angle of winding was adjusted to 90° with regard to the axis of mandrel.

The tubular product thus formed, consisting of the carbon fiber impregnated with the resin composition and the mandrel, was cured for 4 hours in an oven kept at 210° C. while continuously rotating it. After slowly cooling it, the mandrel was withdrawn to obtain a fiber-reinforced tubular product.

The cured product thus obtained was cut, and the cut surface was examined by means of scanning electron microscope to confirm the absence of vacancies. It contained 58% by volume of carbon fiber. The tubular product was cut perpendicularly with regard to the direction of mandrel axis, and its strength was tested according to Nolring method. The results were as shown in Table 10.

TABLE 10

|  | 25° C. | 180° C. | 230° C. |
|---|---|---|---|
| Tensile strength (kg/mm$^2$) | 205 | 169 | 151 |
| Tensile modulus (t/mm$^2$) | 12.4 | 12.1 | 11.8 |

The method for the measurement of Nolring tensile strength — ASTM D-2290

As measured by TMA (thermal mechanical analysis), its glass transition temperature was 310° C. A specimen was cut out of this cured product and dipped in hot water (100° C.) for 48 hours. Both the sample dipped in hot water and the sample not dipped in hot water were examined by DMA (dynamic mechanical analysis). As the result, no difference was found between the sample dipped in hot water and the sample not dipped in hot water.

EXAMPLE 20

A one-directioanally reinforced composite material containing 60% by volume of alumina fiber was prepared by repeating the procedure of Example 1, except that alumina fiber (manufactured by Sumitomo Chemical Co., Ltd.) was used as the reinforcing fiber. It was named Sample S.

A specimen was cut out of Sample S and dipped in hot water (100° C.) for 48 hours. It was named Sample T.

Properties of Sample S and Sample T were measured to obtain the results shown in Table 11.

COMPARATIVE EXAMPLE 8

A one-directionally reinforced composite material was prepared by repeating the procedure of Comparative Example 7, except that alumina fiber (manufactured by Sumitomo Chemical Co., Ltd.) was used as the reinforcing fiber. The composite material thus obtained contained 60% by volume of alumina fiber.

It was named Sample U. A specimen cut out of Sample U and dipped in hot water (100° C.) for 48 hours was named Sample V.

Properties of Sample U and Sample V were measured to obtain the results shown in Table 11.

TABLE 11

|  | Unit | Sample S | Sample T | Sample U | Sample V |
|---|---|---|---|---|---|
| Interlaminar shear strength (20° C.) | kg/mm$^2$ | 13.3 | 12.5 | 12.4 | 11.6 |
| Interlaminar shear strength (180° C.) | " | 9.0 | 6.2 | 5.4 | 2.2 |
| Interlaminar shear strength (230° C.) | " | 7.2 | 4.9 | 2.1 | Unmeasurable |
| Bending strength (25° C.) | " | 171 | 163 | 155 | 148 |
| Bending strength (180° C.) | " | 149 | 129 | 65 | 12 |
| Bending strength (230° C.) | " | 143 | 110 | 18 | Unmeasurable |

Methods of measurements:
Interlaminar shear strength — ASTM D-2344
Bending strength — ASTM D-790

What is claimed is:

1. A thermosetting resin composition comprising a polymaleimide compound having two or more maleimide groups in its molecule, a phenol novolac resin of which some of the phenolic hydroxyl groups have been allyl-etherified and the residual phenolic hydroxyl groups have been converted to an epoxide moiety and the ratio of the allyl-etherified hydroxyl groups to the epoxidized hydroxyl groups is in the range of 0.5 to 9.0 and, as an optional ingredient, a curing agent.

2. A thermosetting resin composition according to claim 1, wherein said polymaleimide compound is a compound having two or more maleimide groups represented by the following general formula (I) in one molecule:

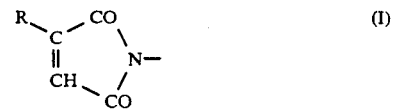

wherein R represents hydrogen atom or lower alkyl group having 1 to 5 carbon atoms.

3. A thermosetting resin composition according to claim 2, wherein said polymaleimide compound is N,N'-diphenylmethane bismaleimide or N,N'-diphenyl ether bismaleimide.

4. A thermosetting resin composition according to claim 1, wherein said novolac resin is a cresol novolac resin.

5. A thermosetting resin composition according to claim 1, wherein said curing agent is Bisphenol A.

6. A thermosetting resin composition according to claim 1, wherein the ratio of the double bond of the polymaleimide compound to the double bond of the phenol novolac resin is in the range of 0.5 to 3.

7. A thermosetting resin composition according to claim 5, wherein the ratio of active hydrogen of the curing agent to epoxy group of the phenol novolac resin is 3 or below.

8. A thermosetting resin composition comprising:
a polymaleimide compound having two or more maleimide groups in its molecule,
at least one partially epoxidized phenol novolac resin selected from the group consisting of:
a partially epoxidized phenol novolac resin obtained by partially allyl-etherifying a phenol novolac resin and reacting the residual phenolic hydroxyl groups with an epihalohydrin in the presence of an alkali, and
a partially epoxidized phenol novolac resin obtained by substantially allyl-etherifying a phenol novolac resin and partially epoxidizing the allyl-etherified product with a peroxide, wherein the ratio of the allyl-etherified hydroxyl groups to the epoxidized hydroxyl groups is in the range of 0.5 to 9.0, and
as an optional ingredient, a curing agent.

9. A thermosetting resin composition according to claim 8, wherein said polymaleimide compound is a compound having two or more maleimide groups represented by the following formula (I) in one molecule:

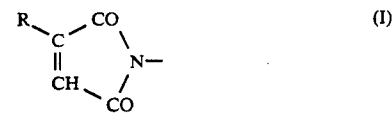

wherein R represents hydrogen atom or lower alkyl group having 1 to 5 carbon atoms.

10. A thermosetting resin composition according to claim 8, wherein said polymaleimide compound is N,N'-diphenylmethane bismaleimide or N,N'-diphenyl ether bismaleimide.

11. A thermosetting resin composition according to claim 8, wherein the partially epoxidized phenol novolac resin is a cresol novolac resin.

12. A thermosetting resin composition according to claim 8, wherein said curing agent is Bisphenol A.

13. A thermosetting resin composition according to claim 8, wherein the ratio of the double bond of the polymaleimide compound to the double bond of the partially epoxidized phenol novolac resin is in the range of 0.5 to 3.

14. A thermosetting resin composition according to claim 8, wherein the ratio of active hydrogen of the curing agent to epoxy group of the partially epoxidized phenol novolac resin is 3 or below.

* * * * *